(12) United States Patent
Altounian et al.

(10) Patent No.: US 11,675,867 B1
(45) Date of Patent: Jun. 13, 2023

(54) RETROACTIVE AND PREDEFINED TEXT SEARCH

(71) Applicant: Content Square SAS, Paris (FR)

(72) Inventors: Stephane Altounian, Paris (FR); Yunbo Wang, Paris (FR); Ryad Zenine, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/874,739

(22) Filed: Jul. 27, 2022

(51) Int. Cl.
*G06F 16/9535* (2019.01)
*G06F 16/957* (2019.01)

(52) U.S. Cl.
CPC ...... *G06F 16/9574* (2019.01); *G06F 16/9535* (2019.01); *G06F 16/9577* (2019.01)

(58) Field of Classification Search
CPC ............. G06F 16/9535; G06F 16/9536; G06F 16/9538; G06F 16/9574; G06F 16/9577
See application file for complete search history.

(56) References Cited

U.S. PATENT DOCUMENTS

| | | | | |
|---|---|---|---|---|
| 2005/0257400 | A1* | 11/2005 | Sommerer | G06F 16/954 36/13 |
| 2018/0067986 | A1* | 3/2018 | Gupta | G06F 3/04842 |
| 2019/0014184 | A1* | 1/2019 | Yavilevich | H04L 67/535 |

* cited by examiner

*Primary Examiner* — Kris E Mackes
(74) *Attorney, Agent, or Firm* — Schwegman Lundberg & Woessner, P.A.

(57) ABSTRACT

A computer-implemented method includes receiving a text search query and session analytics parameters of a website, accessing session tracking analytics data and visibility analytics data of the website, and identifying one or more sessions and one or more viewports from the session tracking analytics data and the visibility analytics data based on text detected in the session tracking analytics data and the visibility analytics data of the website.

19 Claims, 12 Drawing Sheets

FIG. 9

RETROACTIVE AND PREDEFINED TEXT SEARCH

BACKGROUND

Electronic commerce (e-commerce) facilitates trillions of dollars in transactions yearly. Using their personal electronic devices, users can quickly and easily access a business' website or mobile application to purchase goods or services directly from the business.

It is desirable to understand the online customers' digital behaviors and gather insights therefrom. For example, the digital behaviors can include the navigational patterns of the user to the website or within the website as well as interactions with the elements displayed on the website. Improving the online customers' digital experience on the website will directly leads to increased sales and revenue growth from website or mobile application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 9 illustrates an example screenshot of predefined text strings in accordance with one example embodiment.

DETAILED DESCRIPTION

To understand the online customers' digital behaviors, it would be desirable to track and analyze the online customer's digital interactions on webpages of a website. One example of tracking and analyzing interactions include text search. Text search can be implemented as a segment condition that filters sessions where users have seen a specific text string. For example, text search enables a member client device to search for a string of text "seen" by users (e.g., customer client devices). In one example embodiment, the term "seen by users" refers to a text string (in a webpage) that is visible if the text string is displayed in an upper portion (e.g., upper half) in the viewport (e.g., what is displayed within a screen/window of a user web browser application) for at least 1 second. In other examples, the text string is "seen by users" as long as the text string appeared/is displayed in the viewport during a user session of a website (e.g., user accessing the website, browsing the website, and leaving the website).

The present application describes a system for enabling text search by tracking and analyzing customer's digital interactions on webpages of a website using a tracking tag. The tracking tag can be a JavaScript code that is built on a repository and further built into an experience analytics script 122, which is a large JavaScript file that is loaded on client websites. The tracking tag in the scripts may be using calls to the native functions of a browser in order to track the user's interactions on a webpage (e.g., whether a text string has been displayed within the dimensions of the browser screen of the client device).

In one example embodiment, a computer-implemented method for searching text displayed and seen by users in web browsing sessions includes receiving a text search query and session analytics parameters of a website, accessing session tracking analytics data and visibility analytics data of the website, and identifying one or more sessions and one or more viewports from the session tracking analytics data and the visibility analytics data based on text detected in the session tracking analytics data and the visibility analytics data of the website.

Networked Computing Environment

Figure 1:
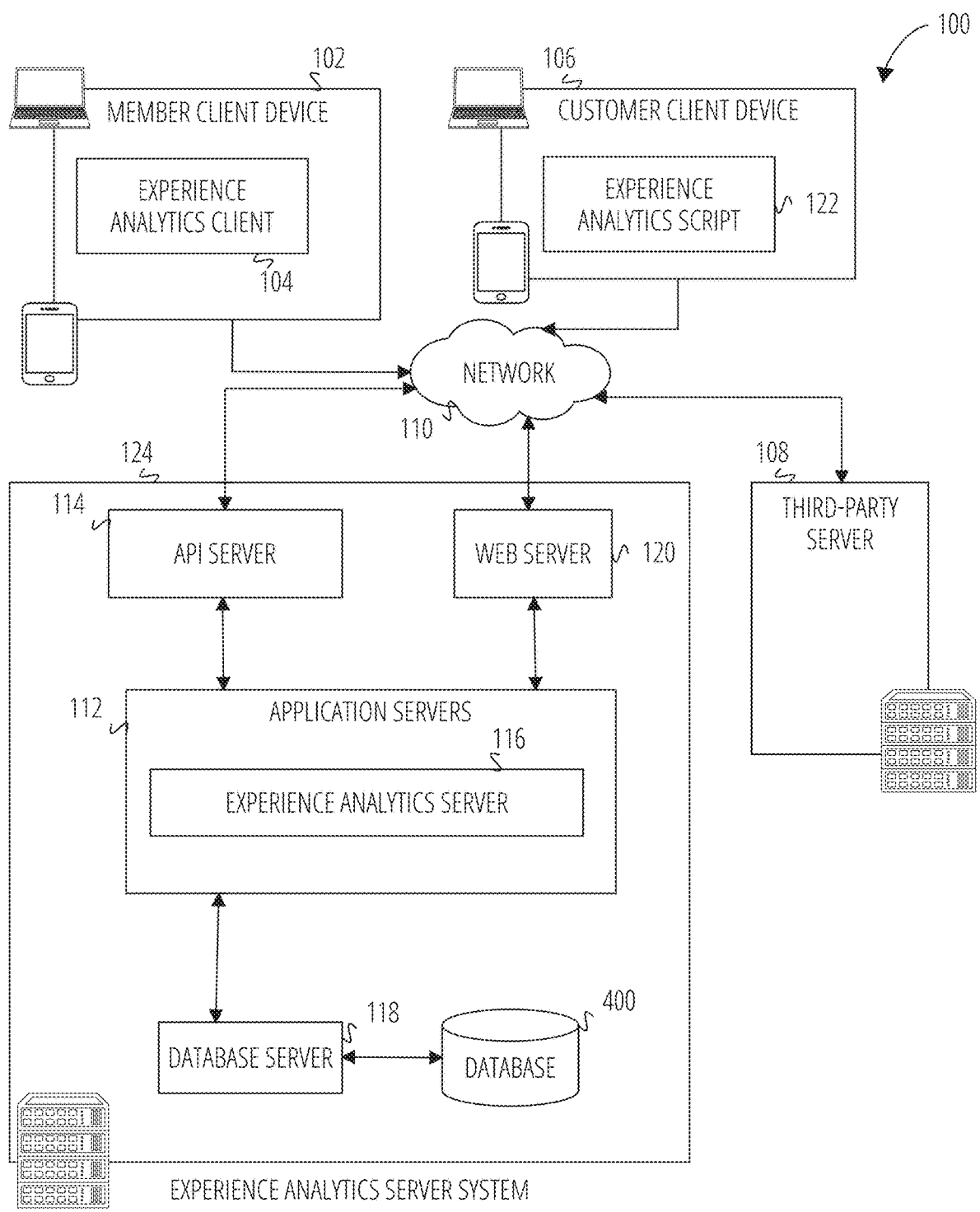
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web master, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 400 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
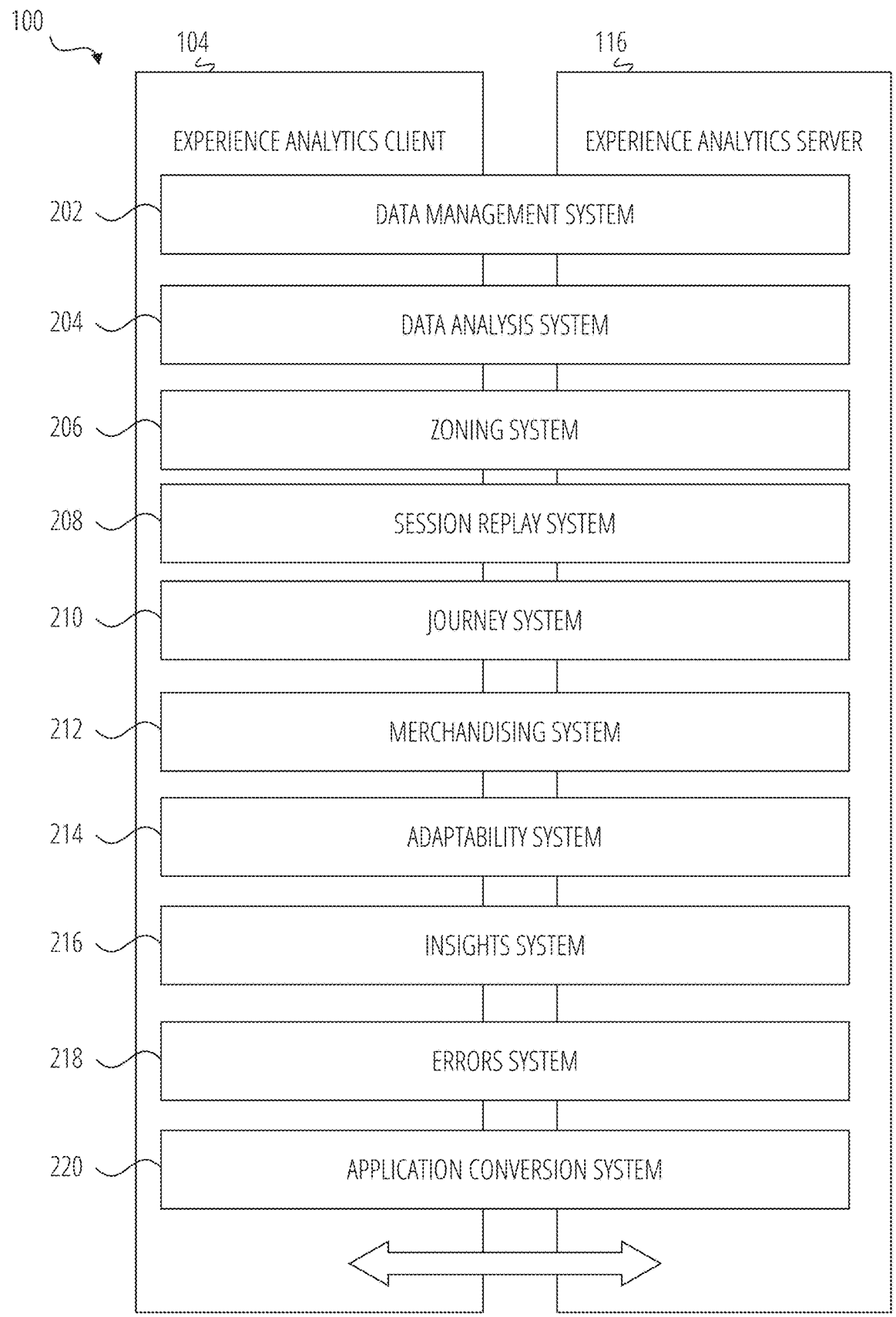
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data. In one example, the data analysis system 204 enables text searches of user sessions. For example, the data analysis system 204 receives predefined text string entries and performs text searches on the predefined text string. In another example, the data analysis system 204 performs a retroactive text search for non-predefined text strings on users' sessions. The data analysis system 204 enables a customer client device 106 to perform an analysis of text strings seen by the users (e.g., sessions where users have seen "out of stock") in combination with other session replay parameters (e.g., users who clicked on "books" and then clicked on "best sellers"). An example implementation of the data analysis system 204 is described in more detail below with respect to FIG. 3.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Figure 3:
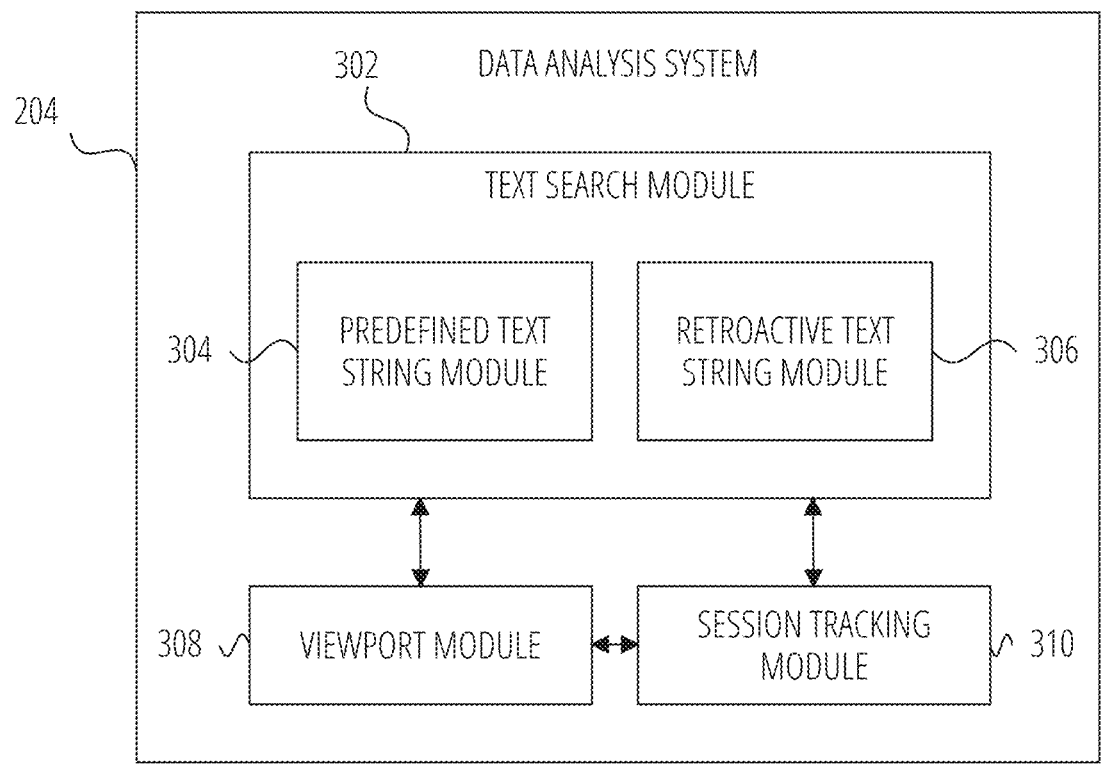
FIG. 3 illustrates an example of a data analysis system in accordance with one example embodiment.

FIG. 3 illustrates an example of the data analysis system 204 in accordance with one example embodiment. The data analysis system 204 includes a text search module 302, a viewport module 308, and a session tracking module 310.

The text search module 302 enables a member client device 102 to search for users (and sessions) who have seen or have not seen a predefined text string (or retroactively search for a non-predefined text string), on any page, a specific page, or specific URL of a website. The text search module 302 includes a predefined text string module 304 and a retroactive text string module 306. In one example, the text search module 302 enables text searches of user sessions. The text search module 302 can search for predefined text strings (using a predefined text string module 304) and retroactively search for non-predefined text strings (using a retroactive text string module 306). In one example embodiment, the text search module 302 generates text search results based on sessions and not page views.

The predefined text string module 304 receives predefined text string entries (e.g., "out of stock") and performs text searches for the predefined text string on users' sessions (e.g., sessions and webpages where a user has seen the string "out of stock"). For example, the member client device 102 enters the text string "out of stock" as a predefined text string in an entry field generated by the predefined text string module 304. In one example, the predefined text string module 304 enables a user of the member client device 102 to enter different characters and formats (e.g., punctuation, symbols, marks, special characters, numbers, non-Roman/Latin alphabets, Japanese characters, case-sensitive) in the entry field of the predefined text string module 304. The predefined text string module 304 stores the predefined text string entries and parses the viewport of the webpages accessed by the customer client device 106 for the predefined text string, during a session. For example, text search data goes through a session replay pipeline of session replay system 208 where only text strings on pages recorded by the session replay are captured. In another example embodiment, the predefined text string module 304 can also dynamic perform text search (e.g., [color] shoes) to identify sessions where users have seen any color shoes text in the corresponding viewport.

The retroactive text string module 306 performs a retroactive text search for non-predefined text strings on users' sessions. In one example, the retroactive text string module 306 leverages the tracking tag operating on the users' sessions to retroactively track and identify non-predefined text strings. For example, the member client devices 102 can still perform a text search for sessions during periods of times where the text string was not predefined.

The viewport module 308 tracks portions of webpages that have been displayed within a browser window of the customer client device 106 and seen by users of the customer client device 106. For example, during a user session, if the text string "an error occurred" was visible if its upper half is visible in the viewport, the text string will be taken into account in text search results (even only the top of the letters are displayed in a corner of the page). On the other hand, if the text string "an error occurred" is hidden within a dropdown menu, even if the menu is visible, this instance of the text string is not counted as visible because the user has not opened the menu. As such, the instance of the text string will not be taken into account in text search results.

The session tracking module 310 tracks interactions of the customer client device 106 with the web server 120 or third-party server 108. For example, the session tracking module 310 tracks using tracking tags where the customer client device 106 has hovered a pointer, which areas/zones are hovered by the pointer, user interfaces that the customer client device 106 has clicked on or selected, how long the customer client device 106 has stayed on a web page, scrolling behavior (e.g., direction, scroll speed) of a webpage, browsing session path, and so forth.

The data analysis system 204 provides segmentation capabilities based on full text search. In other words, the data analysis system 204 enables the member client device 102 to segment their users (customer client device 106) based specific pieces of text that where visible during the session. In order to do so, the data analysis system 204 leverage the session replay system 208 and extracts text from each session replay page view and make it available in the database 400 for querying.

The data analysis system 204 mixes text search segments with other types of segmentation available in the experience analytics client 104. In one example, the text search module 302 uses the database 400 to store the extracted text. The text search module 302 can preprocess the text in an upfront component (e.g., predefined text string module 304 or retroactive text string module 306) to render the queries more efficient. In the case of predefined text strings, the predefined text string module 304 pre-compute text search results and stores all the text in the database 400. In the case of non-predefined text strings, the retroactive text string module 306 computes the results retroactively and stores the results in the database 400.

In one example architecture of the data analysis system 204, the text search module 302 subscribes to notifications that a finished page view is available. The text search module 302 includes a text extraction component (not shown) and encoding component (not shown). The text search module 302 downloads the page views using the text extraction component. For every page view, the text search module 302 parses the JSON payload sent by the tracking tag and extracts the text using the text extraction component. That text is transformed into a message that is pushed into sessions as an enrichment for the sessionization component. Once the message hits the sessionization component, it is merged with the available session information. After the session ends, the sessionization component pushes the message for the session (containing the text) into the database 400.

In another example embodiment, the data analysis system 204 adjusts an operation of the web server 120 or third-party server 108 hosting the website based on the one or more identified sessions and one or more identified viewports. The data analysis system 204 updates a page of the website based on a text identified in the text search query and detected in the one or more identified sessions and the one or more identified viewports. For example, the data analysis system 204 adjusts web pages to redact or remove items that are listed as "out of stock" for sessions corresponding to session analytics parameters (e.g., sessions where users browsed a website during business hours from a certain region and click on "bestsellers" category). In another example, the data analysis system 204 generates a notification or recommended configuration to the web server 120 or third-party server 108 hosting the website to modify the web pages.

Data Architecture

Figure 4:
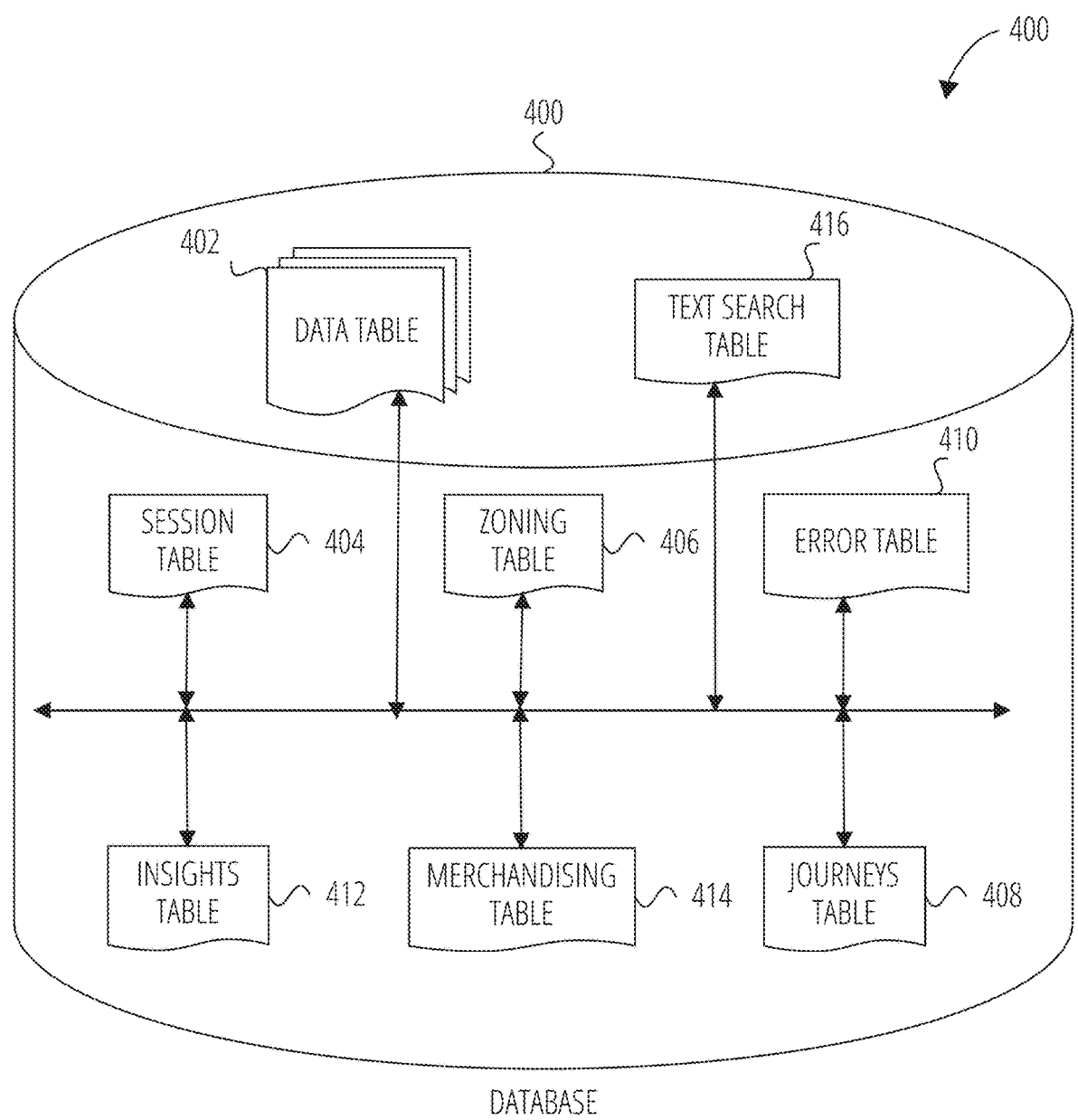
FIG. 4 is a diagrammatic representation of a data structure as maintained in a database, in accordance with some examples.

FIG. 4 is a schematic diagram illustrating database 400, which may be stored in the database 400 of the experience analytics server 116, according to certain examples. While the content of the database 400 is shown to comprise a number of tables, it will be appreciated that the data could be stored in other types of data structures (e.g., as an object-oriented database).

The database 400 includes a data table 402, a session table 404, a zoning table 406, an error table 410, an insights table 412, a merchandising table 414, and a journeys table 408.

The data table 402 stores data regarding the websites and native applications associated with the clients of the experience analytics system 100. The data table 402 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 402 can also store data tags and results of data science and data engineering processes on the data. The data table 402 can also store information such as the font, the images, the videos, the native scripts in the website or applications, etc.

The session table 404 stores session replays for each of the client's websites and native applications.

The zoning table 406 stores data related to the zoning for each of the client's websites and native applications including the zones to be created and the zoning overlay associated with the websites and native applications.

The journeys table 408 stores data related to the journey of each visitor to the client's website or through the native application.

The error table 410 stores data related to the errors generated by the errors system 218 and the insights table 412 stores data related to the insights generated by the insights table 412.

The merchandising table 414 stores data associated with the merchandising system 212. For example, the data in the merchandising table 414 can include the product catalog for each of the clients, information on the competitors of each of the clients, the data associated with the products on the websites and applications, the analytics on the product opportunities and the performance of the products based on the zones in the website or application, etc.

The text search table 416 stores data associated with the text search module 302. For example, the data in text search table 416 can include predefined text strings, non-predefined text strings, and text search results.

Figure 5:
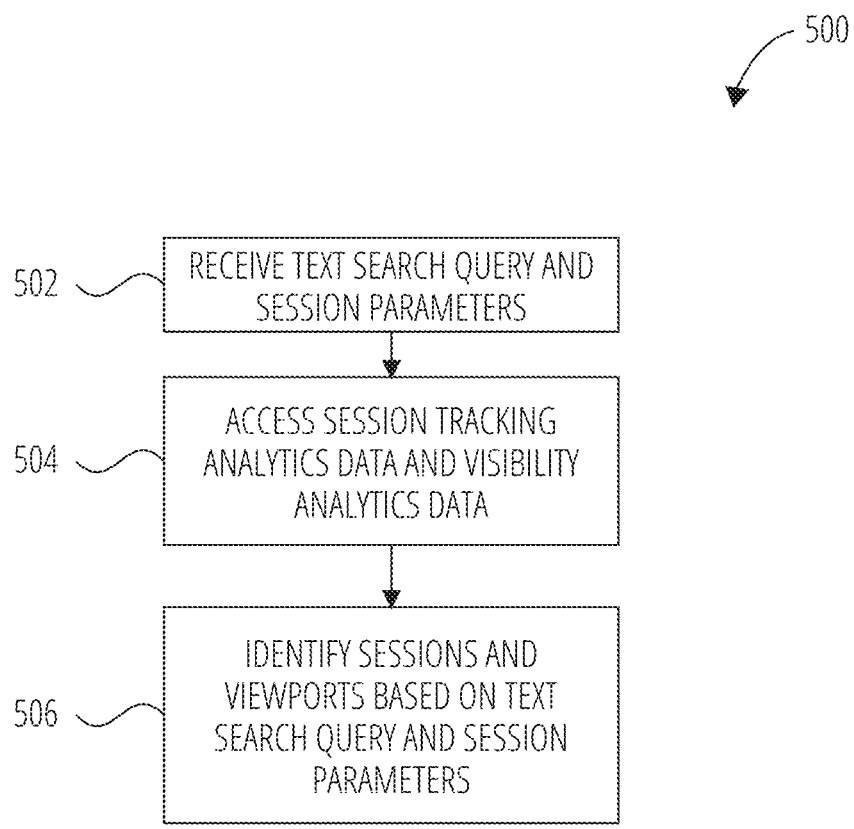
FIG. 5 is a flowchart illustrating a method for receiving text search queries, in accordance with some examples.

FIG. 5 is a flowchart illustrating a method 500 for receiving text search queries, in accordance with some examples.

In block 502, the text search module 302 receives a text search query and session parameters (e.g., sessions between date 1 and date 2 where users have clicked on this, and then on that). In block 504, the text search module 302 accesses session tracking analytics data (from session tracking module 310) and visibility analytics data (from viewport module 308). In block 506, the text search module 302 identifies sessions and viewports based on the text search query and session parameters.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 6:
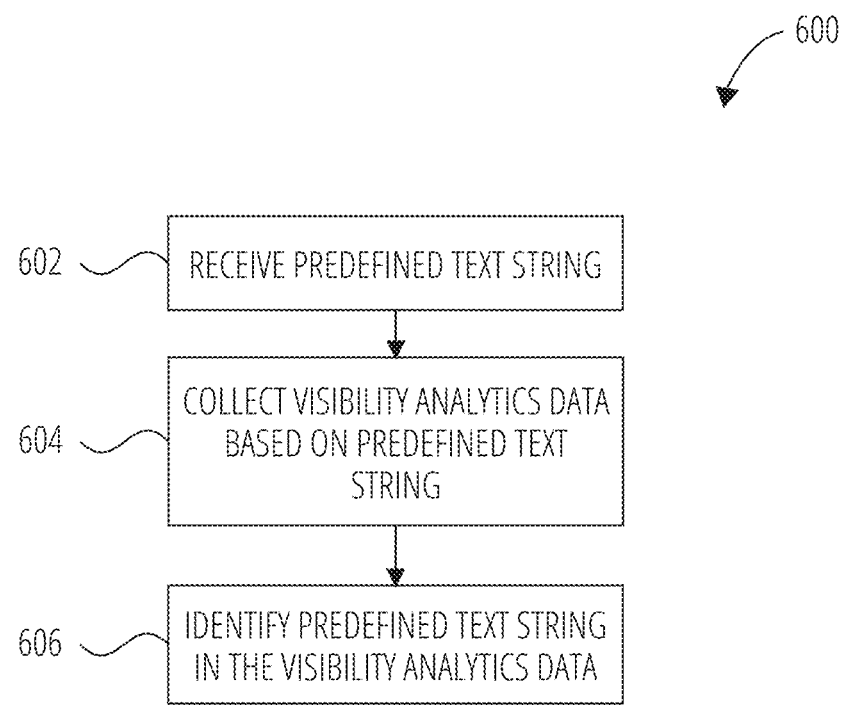
FIG. 6 is a flowchart illustrating a method for receiving predefined text strings, in accordance with some examples.

FIG. 6 is a flowchart illustrating a method 600 for receiving predefined text strings, in accordance with some examples.

In block 602, the predefined text string module 304 receives predefined text strings. In block 604, the predefined text string module 304 collects visibility analytics data (from viewport module 308) based on predefined text strings. In block 606, the session tracking module 310 identifies predefined text strings in the visibility analytics data.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 7:
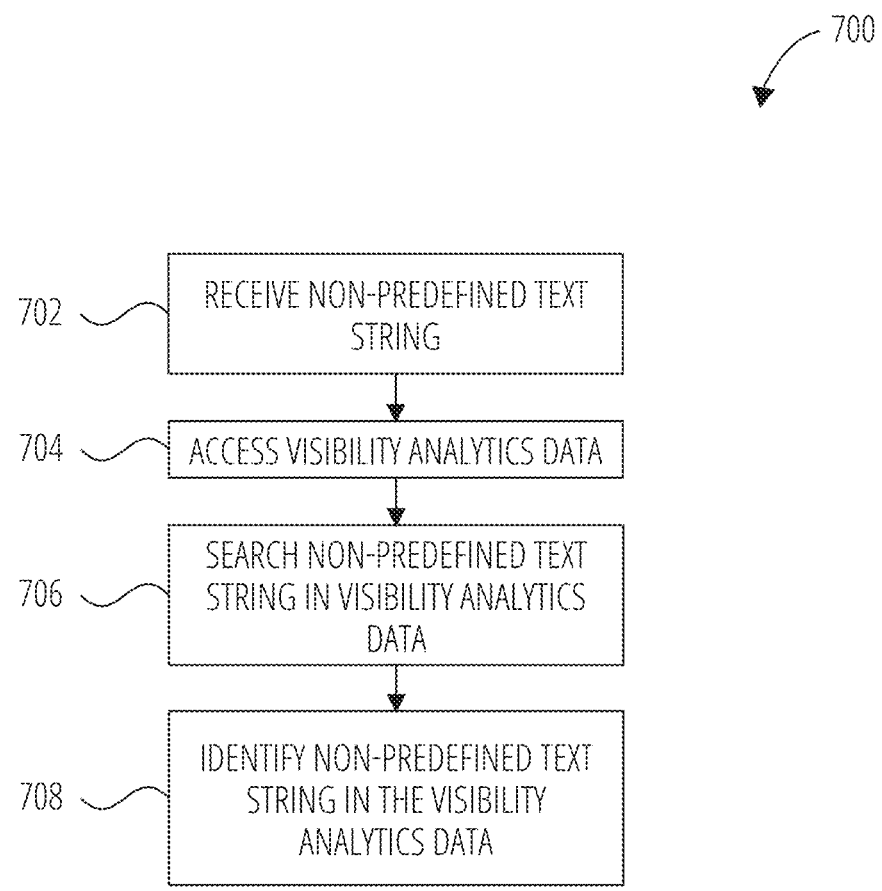
FIG. 7 is a flowchart illustrating a method for receiving non-predefined text string, in accordance with some examples.

FIG. 7 is a flowchart illustrating a method 700 for receiving non-predefined text string, in accordance with some examples.

In block 702, the retroactive text string module 306 receives non-predefined text strings. In block 704, the retroactive text string module 306 accesses visibility analytics data from the viewport module 308. In block 706, the retroactive text string module 306 searches non-predefined text strings in visibility analytics data. In block 708, the session tracking module 310 identifies non-predefined text strings in the visibility analytics data.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 8:
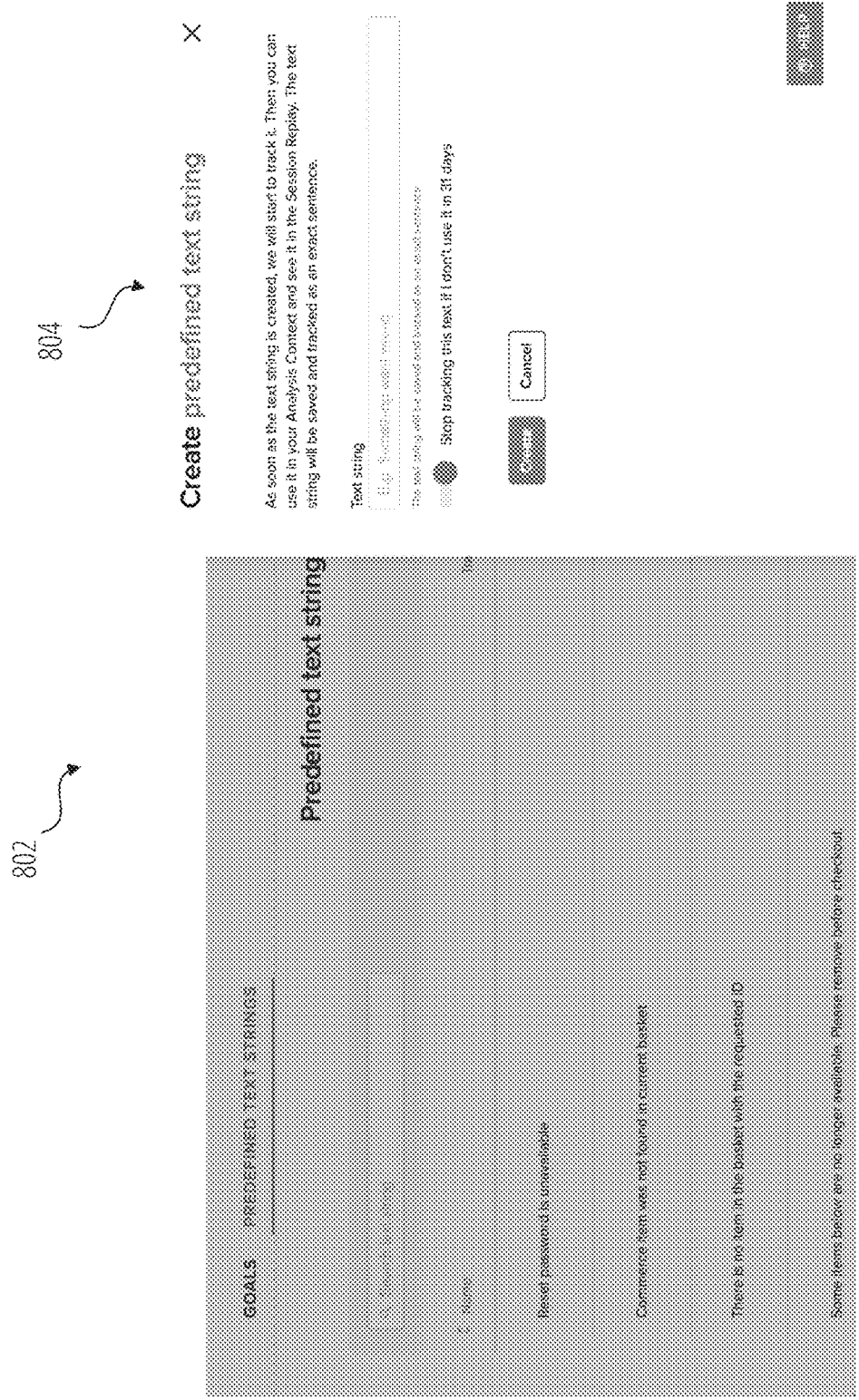
FIG. 8 illustrates an example screenshot of forming a predefined text string in accordance with one example embodiment.

FIG. 8 illustrates an example screenshot 802 of forming a predefined text string in accordance with one example embodiment. The screenshot 802 illustrates an example of a predefined text string graphical user interface 804.

Figure 9:
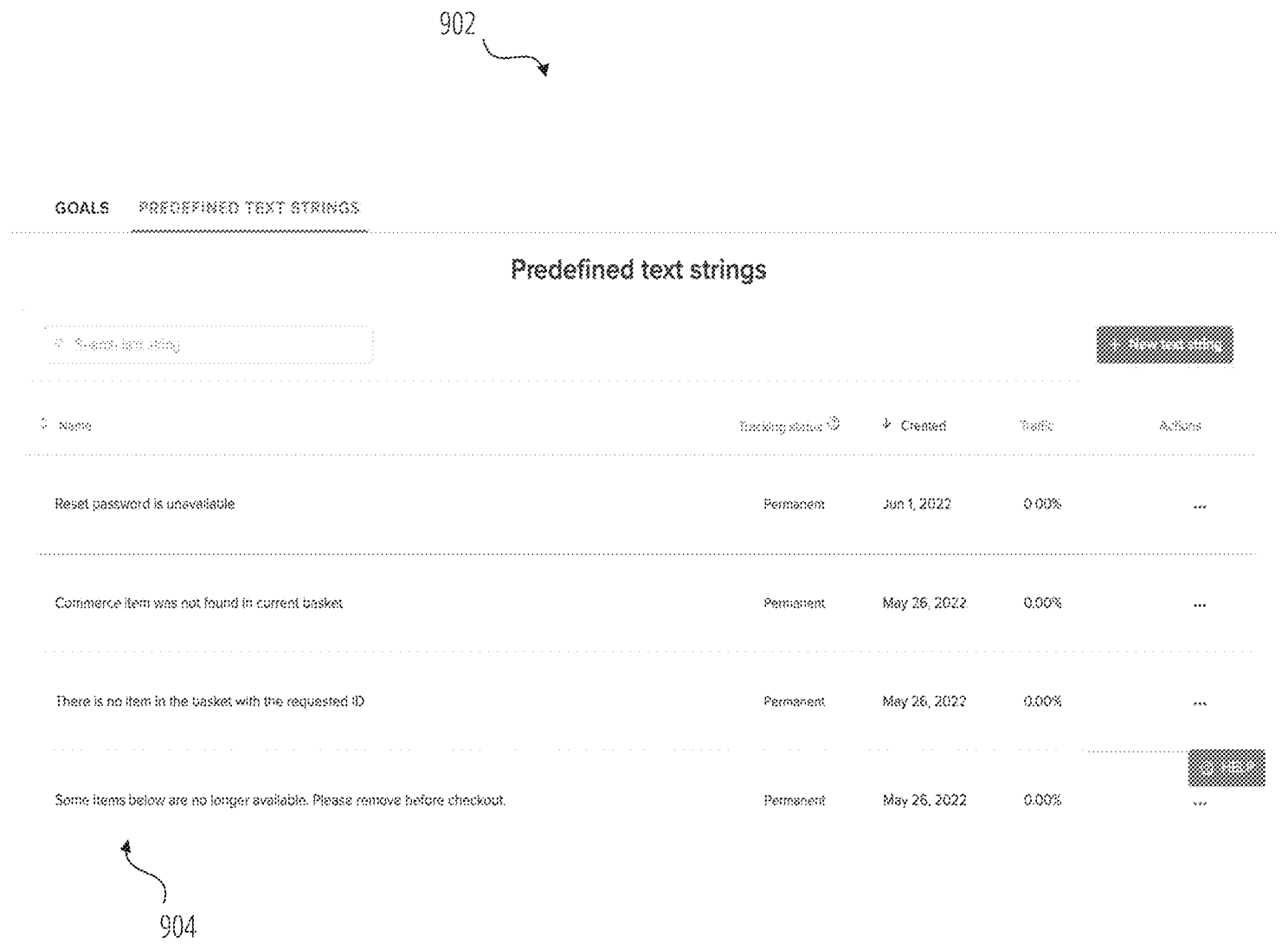

FIG. 9 illustrates an example screenshot 902 of predefined text strings in accordance with one example embodiment. the screenshot 902 illustrates examples of predefined text strings 904.

Figure 10:
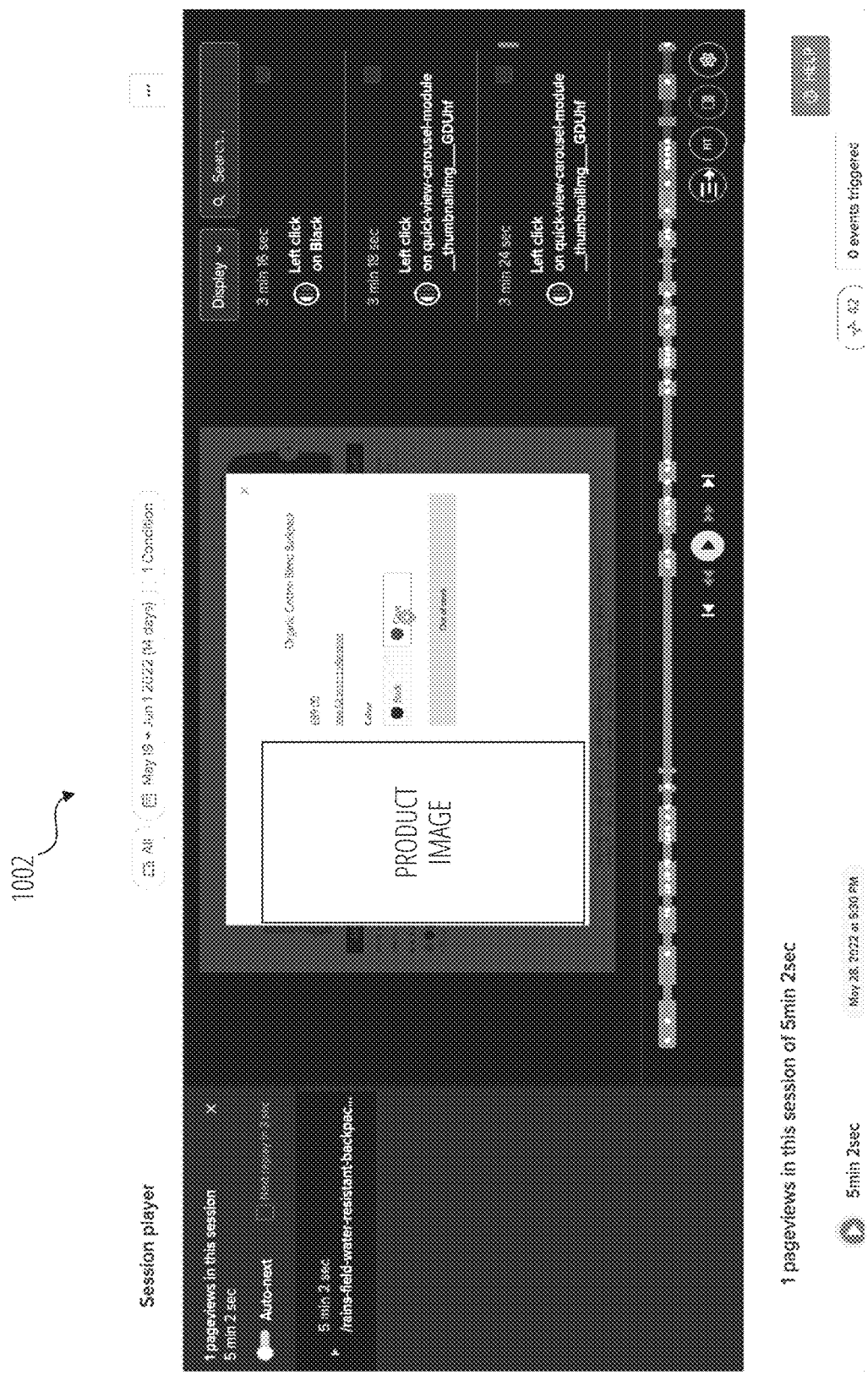
FIG. 10 illustrates an example screenshot of a session replay in accordance with one example embodiment.

FIG. 10 illustrates an example screenshot 1002 of a session replay in accordance with one example embodiment.

Machine Architecture

Figure 11:
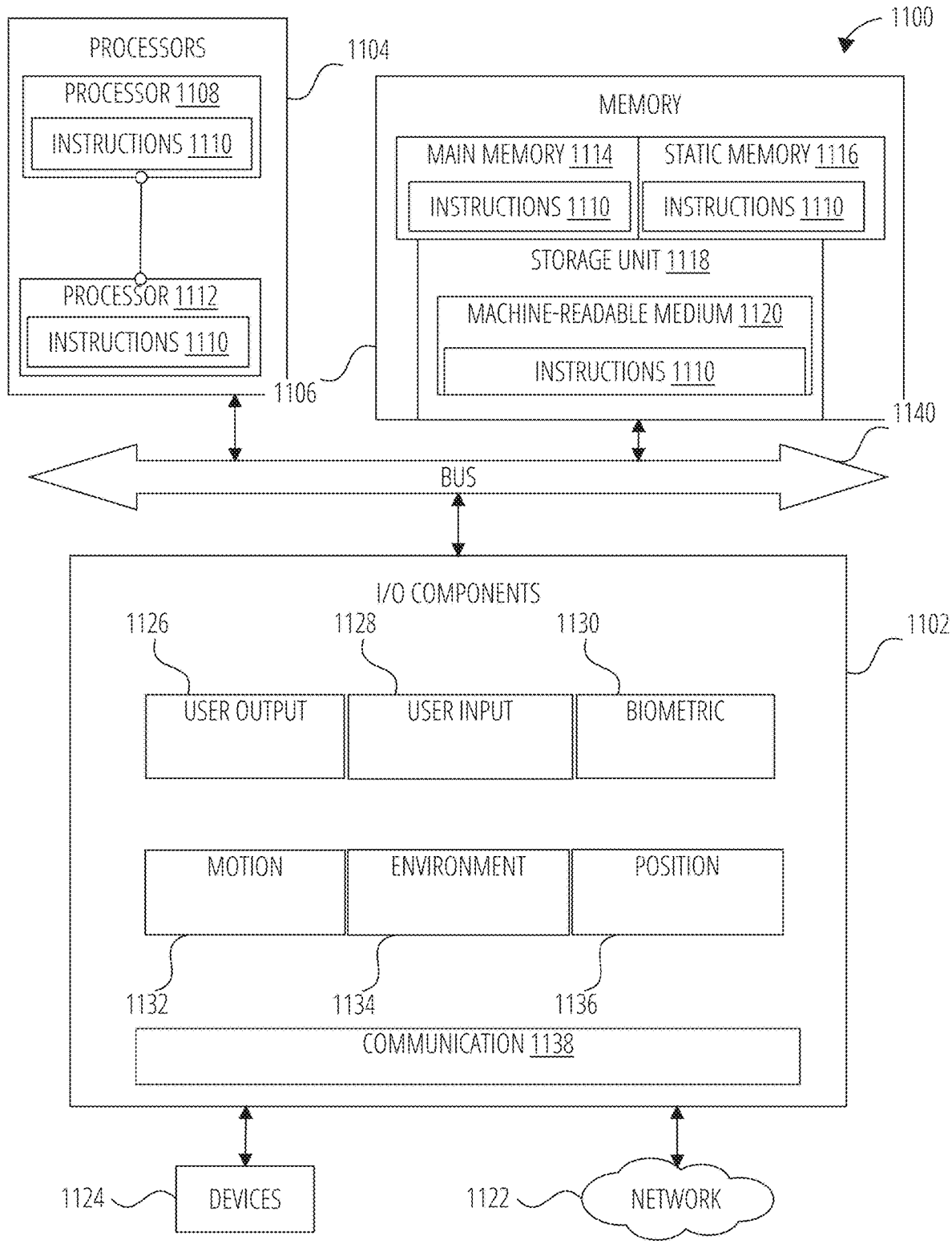
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an application, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the member client device 102 or any one of a number of server devices forming part of the experience analytics server 116. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1102, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the processor's cache memory), or any suitable combination thereof, during execution thereof by the machine 1100.

The I/O components 1102 may include a wide variety of components to receive input, provide output, produce output, transmit information, exchange information, capture measurements, and so on. The specific 110 components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the 1/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 3600 camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Software Architecture

Figure 12:
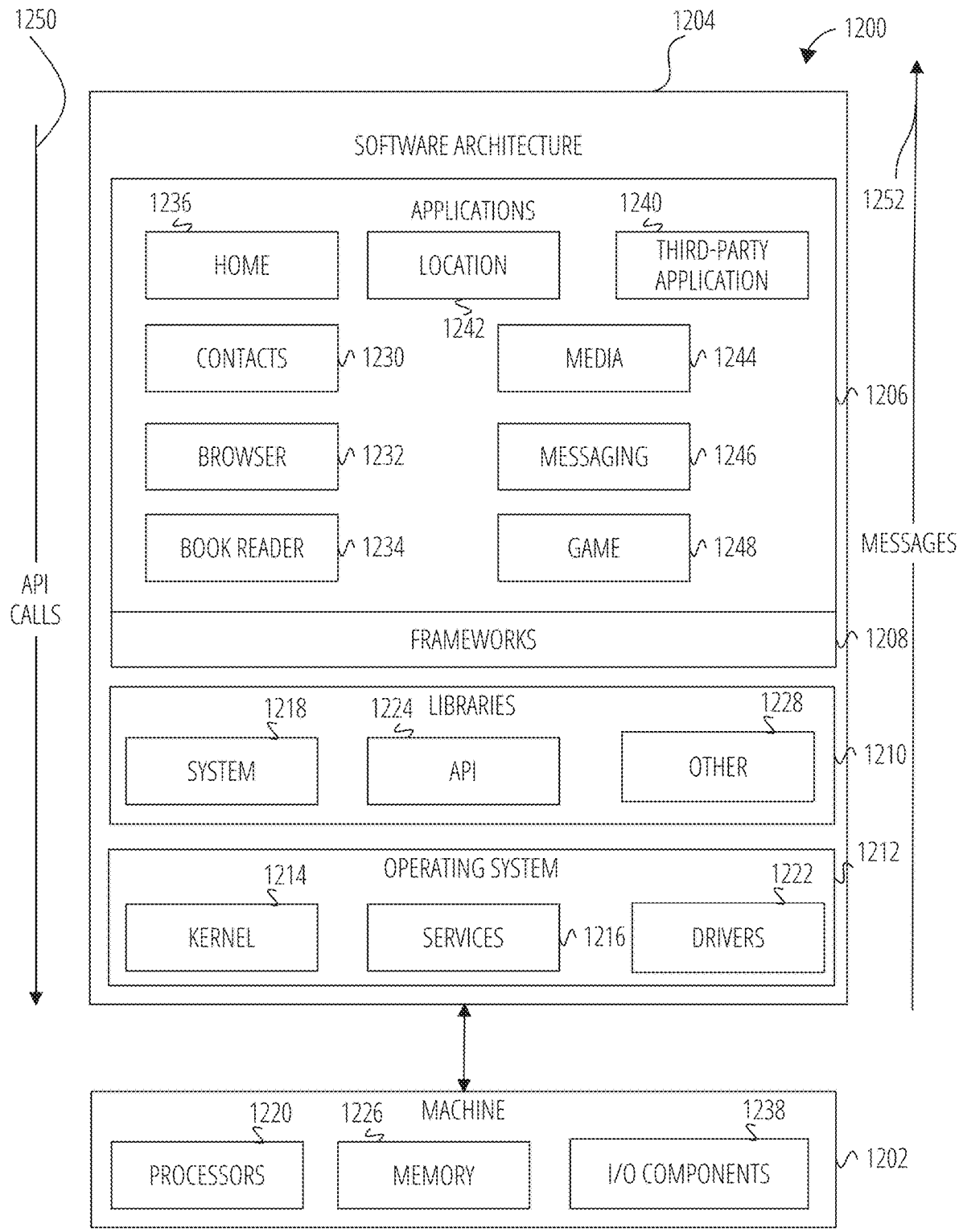
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

EXAMPLES

Example 1 is a computer-implemented method comprising: receiving a text search query and session analytics parameters of a website; accessing session tracking analytics data and visibility analytics data of the website; and identifying one or more sessions and one or more viewports from the session tracking analytics data and the visibility analytics data based on text detected in the session tracking analytics data and the visibility analytics data of the website.

Example 2 includes the method of example 1, wherein the session tracking analytics data indicate a plurality of browsing paths of the website from a plurality of users, wherein the visibility analytics data indicate portions of the website that are viewed by the plurality of users.

Example 3 includes the method of example 1, wherein the session analytics parameters indicate user interactions of the website.

Example 4 includes the method of example 1, wherein the text search query comprises a query for a predefined text string.

Example 5 includes the method of example 4, further comprising: generating a web analytics script; collecting the session tracking analytics data and visibility analytics data of the website by operating the web analytics script during web browsing sessions of the website of a plurality of client devices, the web analytics script comprising a tracking tag that is configured to track interactions of the plurality of client devices with the website; and identifying the predefined text string in the session tracking analytics data and visibility analytics data of the website.

Example 6 includes the method of example 1, wherein the text search query comprises a query for a non-predefined text string.

Example 7 includes the method of example 6, further comprising: identifying the non-predefined text string in the session tracking analytics data and visibility analytics data of the website.

Example 8 includes the method of example 1, further comprising: operating a web analytics script during web browsing sessions of the website of a plurality of client devices, the web analytics script comprising a tracking tag that is configured to track interactions of the plurality of client devices with the website.

Example 9 includes the method of example 8, further comprising: identifying portions of the website that are visible and viewed by a user based on the interactions of the plurality of the client devices; and identifying user web sessions where a portion of the website includes text identified in the text search query.

Example 10 includes the method of example 1, further comprising: adjusting an operation of a server hosting the website based on the one or more identified sessions and one or more identified viewports, wherein adjusting the operation comprises updating a page of the website based on a text identified in the text search query and detected in the one or more identified sessions and the one or more identified viewports.

Example 11 is a computing apparatus comprising: a processor; and a memory storing instructions that, when executed by the processor, configure the apparatus to perform operations comprising: receive a text search query and session analytics parameters of a website; access session tracking analytics data and visibility analytics data of the website; and identify one or more sessions and one or more viewports from the session tracking analytics data and the visibility analytics data based on text detected in the session tracking analytics data and the visibility analytics data of the website.

Example 12 includes the computing apparatus of example 11, wherein the session track analytics data indicate a plurality of browsing paths of the website from a plurality of users, wherein the visibility analytics data indicate portions of the website that are viewed by the plurality of users.

Example 13 includes the computing apparatus of example 11, wherein the session analytics parameters indicate user interactions of the website.

Example 14 includes the computing apparatus of example 11, wherein the text search query comprises a query for a predefined text string.

Example 15 includes the computing apparatus of example 14, wherein the operations comprise: generate a web analytics script; collect the session tracking analytics data and visibility analytics data of the website by operating the web analytics script during web browsing sessions of the website of a plurality of client devices, the web analytics script comprising a tracking tag that is configured to track interactions of the plurality of client devices with the website; and identify the predefined text string in the session tracking analytics data and visibility analytics data of the website.

Example 16 includes the computing apparatus of example 11, wherein the text search query comprises a query for a non-predefined text string.

Example 17 includes the computing apparatus of example 16, wherein the operations comprise: identify the non-predefined text string in the session tracking analytics data and visibility analytics data of the website.

Example 18 includes the computing apparatus of example 11, wherein the operations comprise: operate a web analytics script during web browsing sessions of the website of a plurality of client devices, the web analytics script comprising a tracking tag that is configured to track interactions of the plurality of client devices with the website.

Example 19 includes the computing apparatus of example 18, wherein the operations comprise: identify portions of the website that are visible and viewed by a user based on the interactions of the plurality of the client devices; and identify user web sessions where a portion of the website includes text identified in the text search query.

Example 20 is a non-transitory computer-readable storage medium, the computer-readable storage medium including instructions that when executed by a computer, cause the computer to: receive a text search query and session analytics parameters of a website; access session tracking analytics data and visibility analytics data of the website; and identify one or more sessions and one or more viewports from the session tracking analytics data and the visibility analytics data based on text detected in the session tracking analytics data and the visibility analytics data of the website.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A computer-implemented method comprising:
receiving a text search query and session analytics parameters of a website;
accessing session tracking analytics data and visibility analytics data of the website;
identifying one or more sessions and one or more viewports from the session tracking analytics data and the visibility analytics data based on text detected in the session tracking analytics data and the visibility analytics data of the website; and adjusting an operation of a server hosting the website based on the one or more identified sessions and one or more identified viewports,
wherein adjusting the operation comprises updating a page of the website based on a text identified in the text search query and detected in the one or more identified sessions and the one or more identified viewports.

2. The method of claim 1, wherein the session tracking analytics data indicate a plurality of browsing paths of the website from a plurality of users, wherein the visibility analytics data indicate portions of the website that are viewed by the plurality of users.

3. The method of claim 1, wherein the session analytics parameters indicate user interactions of the website.

4. The method of claim 1, wherein the text search query comprises a query for a predefined text string.

5. The method of claim 4, further comprising:
generating a web analytics script;
collecting the session tracking analytics data and visibility analytics data of the website by operating the web analytics script during web browsing sessions of the website of a plurality of client devices, the web analytics script comprising a tracking tag that is configured to track interactions of the plurality of client devices with the website; and
identifying the predefined text string in the session tracking analytics data and visibility analytics data of the website.

6. The method of claim 1, wherein the text search query comprises a query for a non-predefined text string.

7. The method of claim 6, further comprising:
identifying the non-predefined text string in the session tracking analytics data and visibility analytics data of the website.

8. The method of claim 1, further comprising:
operating a web analytics script during web browsing sessions of the website of a plurality of client devices, the web analytics script comprising a tracking tag that is configured to track interactions of the plurality of client devices with the website.

9. The method of claim 8, further comprising:
identifying portions of the website that are visible and viewed by a user based on the interactions of the plurality of the client devices; and
identifying user web sessions where a portion of the website includes text identified in the text search query.

10. A computing apparatus comprising:
a processor; and
a memory storing instructions that, when executed by the processor, configure the apparatus to perform operations comprising:
receive a text search query and session analytics parameters of a website;
access session tracking analytics data and visibility analytics data of the website;
identify one or more sessions and one or more viewports from the session tracking analytics data and the visibility analytics data based on text detected in the session tracking analytics data and the visibility analytics data of the website; and
adjust an operation of a server hosting the website based on the one or more identified sessions and one or more identified viewports,
wherein adjusting the operation comprises updating a page of the website based on a text identified in the text search query and detected in the one or more identified sessions and the one or more identified viewports.

11. The computing apparatus of claim 10, wherein the session track analytics data indicate a plurality of browsing paths of the website from a plurality of users, wherein the visibility analytics data indicate portions of the website that are viewed by the plurality of users.

12. The computing apparatus of claim 10, wherein the session analytics parameters indicate user interactions of the website.

13. The computing apparatus of claim 10, wherein the text search query comprises a query for a predefined text string.

14. The computing apparatus of claim 13, wherein the operations comprise:
generate a web analytics script;
collect the session tracking analytics data and visibility analytics data of the website by operating the web analytics script during web browsing sessions of the website of a plurality of client devices, the web analytics script comprising a tracking tag that is configured to track interactions of the plurality of client devices with the website; and
identify the predefined text string in the session tracking analytics data and visibility analytics data of the website.

15. The computing apparatus of claim 10, wherein the text search query comprises a query for a non-predefined text string.

16. The computing apparatus of claim 15, wherein the operations comprise:
identify the non-predefined text string in the session tracking analytics data and visibility analytics data of the website.

17. The computing apparatus of claim 10, wherein the operations comprise:
operate a web analytics script during web browsing sessions of the website of a plurality of client devices, the web analytics script comprising a tracking tag that is configured to track interactions of the plurality of client devices with the website.

18. The computing apparatus of claim 17, wherein the operations comprise:
identify portions of the website that are visible and viewed by a user based on the interactions of the plurality of the client devices; and
identify user web sessions where a portion of the website includes text identified in the text search query.

19. A non-transitory computer-readable storage medium, the computer-readable storage medium including instructions that when executed by a computer, cause the computer to:
receive a text search query and session analytics parameters of a website;
access session tracking analytics data and visibility analytics data of the website;
identify one or more sessions and one or more viewports from the session tracking analytics data and the visibility analytics data based on text detected in the session tracking analytics data and the visibility analytics data of the website; and
adjust an operation of a server hosting the website based on the one or more identified sessions and one or more identified viewports,
wherein adjusting the operation comprises updating a page of the website based on a text identified in the text search query and detected in the one or more identified sessions and the one or more identified viewports.

* * * * *

UNITED STATES PATENT AND TRADEMARK OFFICE
CERTIFICATE OF CORRECTION

| | |
|---|---|
| PATENT NO. | : 11,675,867 B1 |
| APPLICATION NO. | : 17/874739 |
| DATED | : June 13, 2023 |
| INVENTOR(S) | : Altounian et al. |

It is certified that error appears in the above-identified patent and that said Letters Patent is hereby corrected as shown below:

In the Specification

In Column 12, Line 6, delete "input/output I/O" and insert --I/O-- therefor

In Column 12, Line 28, delete "1106," and insert --1114,-- therefor

In Column 12, Line 41, delete "110" and insert --I/O-- therefor

In Column 12, Line 49, delete "1/O" and insert --I/O-- therefor

In Column 13, Line 40, delete "3600" and insert --360°-- therefor

Signed and Sealed this
First Day of October, 2024

Katherine Kelly Vidal
*Director of the United States Patent and Trademark Office*